W. H. CRITTENDON.
Wrenches.
No. 149,840.  Patented April 21, 1874.
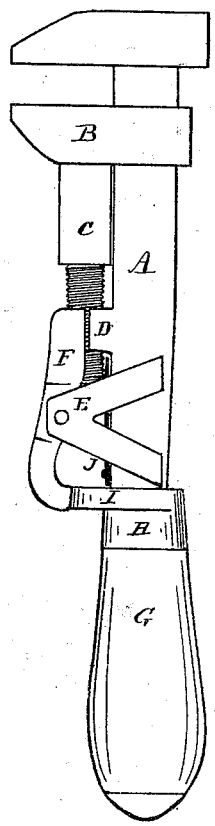
Witnesses.
Jas. Mahon
Emma Withicomb
Inventor
William H. Crittenden
Per Geo. W. Tibbitts, atty.

UNITED STATES PATENT OFFICE.

WILLIAM H. CRITTENDON, OF GRAFTON, OHIO.

IMPROVEMENT IN WRENCHES.

Specification forming part of Letters Patent No. 149,840, dated April 21, 1874; application filed March 13, 1874.

*To all whom it may concern:*

Be it known that I, WILLIAM H. CRITTENDON, of Grafton, county of Lorain and State of Ohio, have invented an Improved Wrench, of which the following is a specification:

This invention relates to an improved construction of that class of wrenches, commonly called the monkey-wrench; and consists in the method of changing the adjustable jaw, and of holding said jaw in place by means of a lever, in combination with a cam on the handle.

To enable others to fully understand my invention, I will proceed to describe the same with the aid of the accompanying drawing, which is a side elevation.

A is the main lever of the wrench, having one of the jaws permanently affixed thereto, and upon which is placed the adjustable jaw B having an arm, C, with a screw-thread cut upon it, and lying next to and parallel with the lever A. In these respects it does not differ from others now in use. My improvements consist in adding to these the following: On the side of the lever A I make a half-nut, D, in which the threaded arm C lies, and upon the sides of the lever A I make ears E, in which is pivoted a lever, F, one end of which lies upon the threaded arm C, having a groove on the side next to said arm to fit over it. Upon the handle G, which turns or revolves on the lever A, is placed a ferrule, H, having a cam, I, forming a part of it, and against which one end of the pivoted lever F impinges.

The operation of this is as follows: To adjust the movable jaw B, the handle is turned so as to bring the cam I around on the opposite side, or away from the lever F, which releases the lever, and a spring, J, on the main lever A, lying under the threaded arm, raises the arm out of the threads in the half-nut B, so that the jaw B may be easily and quickly moved back and forth along the lever A. When the jaw B has been placed where desired, the handle is turned, the cam forcing the lever F down onto the threaded arm, and it is held firmly. This makes a convenient and quickly-adjustable wrench.

Having described my invention, I claim—

The half-nut D, the pivoted lever F, ears E, cam-ferrule H I, and spring J with the lever A, movable jaw B, arm C, and handle G, all arranged to operate as shown and described, and for the purpose set forth.

WM. H. CRITTENDON.

Witnesses:
  GEO. W. TIBBITTS,
  GEO. A. KOLBE.